(12) United States Patent
Malekzadeh et al.

(10) Patent No.: US 8,480,784 B2
(45) Date of Patent: Jul. 9, 2013

(54) METHOD OF PRODUCING HIGH PURITY SILVER NANOPARTICLES

(76) Inventors: Mahdieh Malekzadeh, Tehran (IR); Mohammad Halali, Tehran (IR)

(*) Notice: Subject to any disclaimer, the term of this patent is extended or adjusted under 35 U.S.C. 154(b) by 343 days.

(21) Appl. No.: 12/882,235

(22) Filed: Sep. 15, 2010

(65) Prior Publication Data
US 2012/0060649 A1 Mar. 15, 2012

(51) Int. Cl.
*B22F 9/14* (2006.01)
*B22F 9/20* (2006.01)
*B82Y 40/00* (2011.01)

(52) U.S. Cl.
USPC ............... 75/336; 75/345; 75/367; 977/896; 977/901

(58) Field of Classification Search
None
See application file for complete search history.

(56) References Cited

U.S. PATENT DOCUMENTS

| | | | |
|---|---|---|---|
| 2005/0008861 A1* | 1/2005 | Yadav et al. | 428/403 |
| 2007/0003603 A1* | 1/2007 | Karandikar et al. | 424/443 |
| 2008/0011614 A1* | 1/2008 | Hirata et al. | 205/751 |
| 2010/0065789 A1* | 3/2010 | Sato | 252/514 |

* cited by examiner

*Primary Examiner* — George Wyszomierski
(74) *Attorney, Agent, or Firm* — Barry Choobin; Choobin & Choobin Consultancy Patent 360 LLC

(57) ABSTRACT

The various embodiments herein provide a method of producing silver nanoparticles using an electromagnetic levitation melting process. The method comprises levitating and melting a silver sample using a suitable levitation coil and stabilizing a droplet of molten silver. The silver droplet is heated and levitated simultaneously by an induction furnace as a generator. Argon gas is used to provide the inert atmosphere and also applied to cool and condense the silver vapor into a silver nano powder to obtain a silver nano particle. The synthesized silver nanoparticles are collected by brushing them off the brass cylinder using inert gas and are kept in pure Hexane. The size of the nanoparticles is controlled by rate of cooling and heating temperature. The electromagnetic levitation melting method is applied to provide the high purity of silver nano particles with no vacuum equipments.

20 Claims, 9 Drawing Sheets

METHOD OF PRODUCING HIGH PURITY SILVER NANOPARTICLES

BACKGROUND

1. Technical field

The embodiments herein generally relates to a field of nanotechnology. The embodiments herein particularly relates to a method of producing silver nanoparticles. The embodiments herein more particularly relates to a method of producing high purity silver nanoparticles using electromagnetic levitation melting process.

2. Description of the Related Art

A Nanoscience has been mostly related to a synthesis and a stabilization of metallic nanoparticles, mainly due to their exclusive properties associated with a large surface area to volume ratio by changing from macro to nanoscale.

The size, shape and size distribution of the nanoparticles play a major role in controlling the physical, chemical and electrical properties of the nanoparticle materials.

The research on Silver nanoparticles is focused mainly because of the remarkable use of silver nanoparticles in catalytic, optical, biotechnology and electronic applications.

The recent studies have demonstrated that silver nanoparticles are highly effective antimicrobial agents against bacteria and viruses. Silver nanoparticles are able to interact with HIV-I virus in order to inhibit the virus from binding to the host cells.

Since the properties of silver nanoparticles strongly depend on their size and shapes, the synthesis of silver nanoparticles with a controlled size and morphology has been one of the desired aims in nanotechnology field.

Many different processes for the production of silver nanoparticles have been investigated and each process has its own characteristics advantages and disadvantages. The majority of them are based on the chemical reduction which requires too much processes and too much time. A typical procedure involves growing the nanoparticles in a liquid medium containing various reactants, by particular reducing agents. A stabilizing agent is also added to prevent an agglomeration of the nanoparticles. The chemical methods are of low-cost. However, the usage of toxic solvents, the generation of hazardous by-products and also the contamination of the synthesized particles from the precursor chemicals are the main problems of chemical reduction methods.

Hence there is a growing need for an environmentally friendly preparation process of nanoparticles that do not include toxic solvents and wastes and also contamination of synthesized particles in their process synthesis protocol.

Several U.S. patents including U.S. Pat. No. 5,585,020 issued to Becker et al, U.S. Pat. No. 7,384,448 issued to Johnson, U.S. Pat. No. 7,575,711 issued to Johnson, discloses various ways of producing silver nano particles, but they fail to suggest a process by which stable, pure, and narrow size distribution silver nanoparticles may be produced at increased rates of production.

Hence there is a need for a manufacture of silver nanoparticles with stable, pure and narrow size distribution to increase the rate of production of silver nanoparticles.

The embodiments herein minimize and eliminate some of the above mentioned failures by utilizing a novel method and the structural features are described here.

The above mentioned shortcomings, disadvantages and problems are addressed herein and which will be understood by reading and studying the following specification.

OBJECTIVES OF THE EMBODIMENTS

The primary object of the embodiments herein is to provide a simple and an efficient method of producing silver nanoparticles by Electromagnetic levitation melting.

Another object of the embodiments herein is to provide a method of producing high purity silver nano particles without using any vacuum equipments.

Yet another object of the embodiments herein is to provide a method of producing high purity silver nano particles without requiring any reducing and stabilizing agents.

Yet another object of the embodiments herein is to provide a method of producing high purity silver nano particles without using toxic solvents and generating wastes and hazardous by products.

Yet another object of the embodiments herein is to provide an eco-friendly method of producing silver nano particles.

These and other objects and advantages of the embodiments herein will become readily apparent from the following detailed description taken in conjunction with the accompanying drawings.

SUMMARY

The various embodiments herein provide a method of producing high purity silver nanoparticles using an electromagnetic levitation melting process. The production of nanoparticles with a narrow size distribution is one of the advantages of the embodiments herein. According to the embodiments herein, the method of producing high purity silver nanoparticles enables to obtain more stable and pure silver nanoparticles with narrow size distribution at an increased rate of production.

According to one embodiment herein, a method for producing a silver nanopowder by a physical vapor deposition process is provided. The method involves selecting a suitable levitation coil for an electromagnetic levitation melting and the selected suitable levitation coil is a copper tube.

A levitation chamber is designed and placed inside the levitation coil structure system. The levitation chamber is made of silica glass with an outer diameter of 10-14 mm and a wall thickness of 0.5 mm. the levitation chamber is sealed using the O-rings. A silver sample is placed inside the levitation chamber so that the silver sample is levitated and melted by the electromagnetic field of the levitation coil. The silver sample is placed in the electromagnetic field of the levitation coil at an atmospheric pressure. A preset electrical power of 15 KW and an electric current of 250 mA is applied to the levitation coils after the placing of the silver sample. The silver sample is heated and melted by the electromagnetic field of the levitation coil at a temperature of 1000° C.

The melted silver sample is further heated at a temperature of 1130° C. for producing a vaporized precursor material such as silver vapour. The generated silver vapor is cooling and condensing into silver nanopowder to obtain a silver nanoparticle by blowing a carrier gas at a rate of 10 lit/min in a room temperature.

The carrier gas is an inert gas such as argon. The impurities in the inert gas are removed before blowing by passing the inert gas through a silica gel. The silver nanoparticles obtained from the silver nanopowder are collected in an inert media.

The inert media is a pure n-hexane. A dilute suspension of the silver nanoparticle in high purity n-hexane with a volume ratio of 1:10000 (1 $cm^3$ silver is dissolved in 10000 $cm^3$ of n-hexane) is prepared in a tight container.

According to one embodiment herein, the length of a molten zone is minimized by optimizing the coil design thereby improving the stability of a levitated silver sample.

The levitation coil used for the electromagnetic levitation melting process is arranged in three layers. The first layer of the levitation coil provides a lifting power for the silver sample while the second layer of the levitation coil is responsible for heating and melting the silver sample. The third layer of the levitation coil stabilizes the droplet.

The size of the silver nanoparticles is controlled by a super saturation process. The super saturation process is achieved either by increasing the flow rate of the carrier gas in constant temperature or by increasing the temperature of a molten droplet by the induction furnace in a constant cooling rate Further, the size of a silver nanoparticle obtained of the silver nanopowder depends on the type of inert gas. The silver nanoparticle has a particle size of 54 nm-60 nm.

According to one embodiment herein, the nanoparticle are produced with a narrow size distribution between 10-100 nm.

According to one embodiment herein, the electromagnetic field is provided by an induction furnace inducing eddy currents in the silver sample.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

DETAILED DESCRIPTION OF THE EMBODIMENTS

Figure 1:
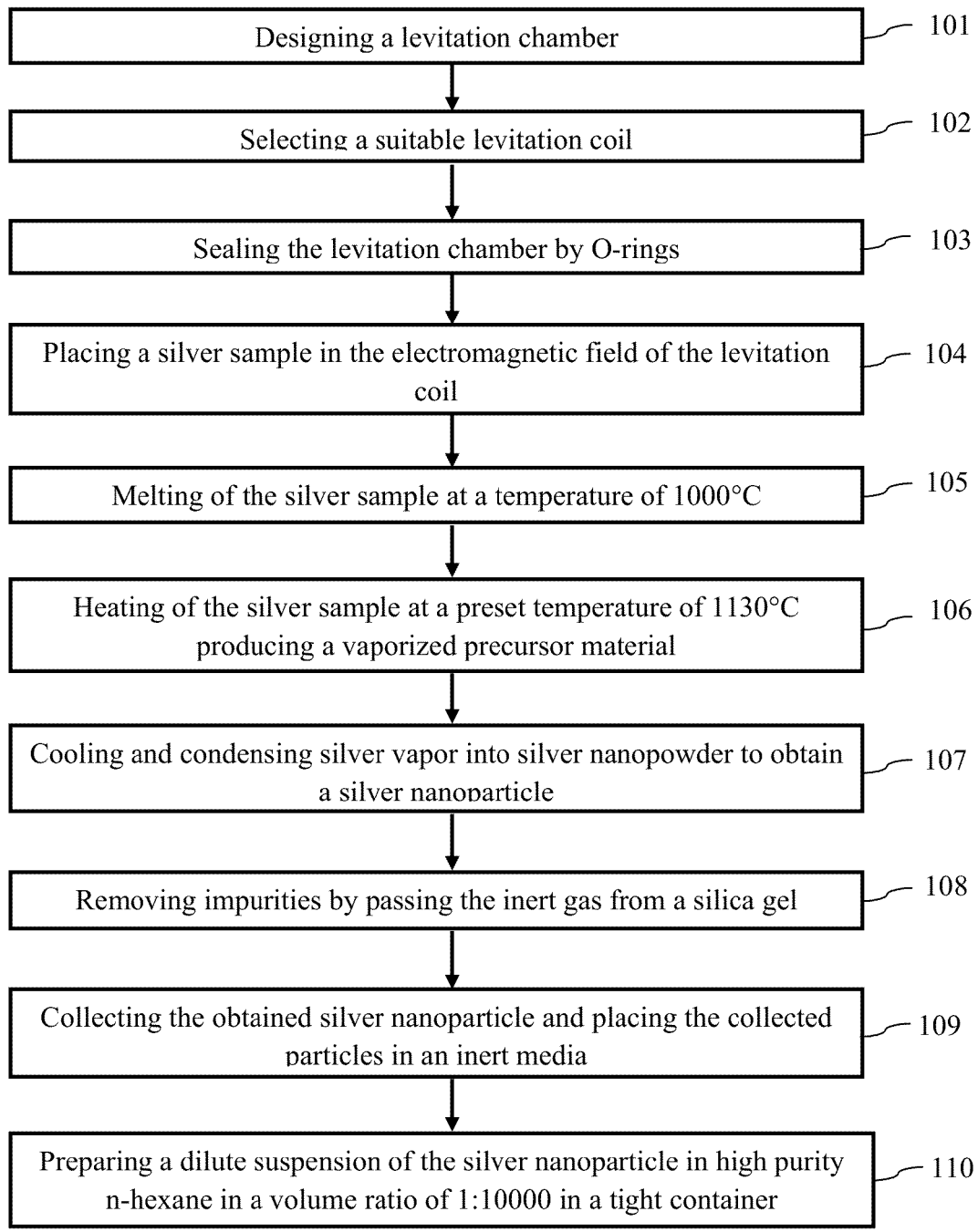
FIG. 1 illustrates a flow chart explaining the method of producing high purity silver nanoparticles by electromagnetic levitation melting method, according to an embodiment herein.

In the following detailed description, a reference is made to the accompanying drawings that form a part hereof and in which the specific embodiments that may be practiced is shown by way of illustration. The embodiments herein are described in sufficient detail to enable those skilled in the art to practice the embodiments herein and it is to be understood that the logical, mechanical and other changes may be made without departing from the scope of the embodiments herein. The following detailed description is therefore not to be taken in a limiting sense.

The various embodiments herein provide a method of producing a silver nanoparticle by electromagnetic levitation melting. According to one embodiment herein, the method of producing the silver nanoparticles of high purity comprises selecting and designing a suitable levitation coil, placing silver sample in the electromagnetic field of the levitation coil to levitate and melting the silver sample simultaneously, heating the silver shot to produce the vaporized precursor material, blowing a carrier gas to cool and condense silver vapor into silver nano powder to obtain a silver nanoparticle and collecting the silver nanoparticle in an inert media such as pure hexane.

According to one embodiment herein a method of producing a silver nanopowder using electromagnetic levitation process, a levitation chamber is designed and a suitable levitation coil is selected. The levitation coil is placed around the levitation chamber. A silver sample is placed in the electromagnetic field of the levitation coil at an atmospheric pressure to levitate and melt the silver sample simultaneously. The levitated and melted silver sample is further heated at a constant temperature to produce a vaporized precursor material. The vaporized precursor material is a silver vapor. A carrier gas is blown into the levitation chamber at a preset rate and at room temperature to cool and condense the silver vapor into a silver nanopowder to obtain a silver nanoparticle. The silver nanoparticle is collected in an inert media to obtain a dilute suspension of the silver nano particles in the inert media in an air tight container by blowing an inert gas at a room temperature. The inert media is a pure n-hexane.

The levitation chamber is made up of a silica glass tube with an outer diameter of 10-14 mm and a wall thickness of 0.5 mm. The levitation chamber is sealed by an O-ring.

The levitation coil is a copper tube. The levitation coil is arranged in a first layer, a second layer and a third layer with mutually different number of turns and wherein the levitation coil arranged in the first layer has a number of turns of 5 for providing a lifting power and wherein the levitation coil arranged in the second layer has a number of turns of 4 for heating the silver sample and for maintaining a temperature and wherein the levitation coil arranged in the third layer has a number of turns of 2 for stabilizing a silver droplet. The levitation coil has a diameter of 10 mm.

The levitation of the silver sample is achieved by passing an electrical power of 15 KW at an electric current of 250 mA through the levitation coil to generate an electromagnetic field to levitate and melt the silver sample simultaneously at a temperature of 1000° C. The length of a molten zone is minimized by optimizing the levitation coil design to improve stability of the levitated silver sample.

The levitated and melted silver sample is further heated at the constant temperature using an induction furnace to produce the vaporized precursor material and the constant temperature is 1130° C.

The carrier gas blown into the levitation chamber to cool and condense the silver vapor into a silver nanopowder is an inert gas. The inert gas is argon. The inert gas is helium. The inert gas is passed through a silica gel to remove impurities present in the inert gas before passing the inert gas through the levitation chamber to collect the silver nanoparticles.

The silver particle is collected as a dilute suspension of the silver particle in a high purity n-hexane. The dilute suspension of the silver particle in the high purity n-hexane has a volume ratio of 1:10000.

A size of the silver nanoparticles is controlled by a super saturation process. The super saturation process is achieved by increasing a flow rate of the carrier gas at a constant temperature. The carrier gas is passed at a rate of 10 liter per minute at a constant temperature of 1130° C. The super saturation process is achieved by increasing a temperature of a molten droplet using the induction furnace at a constant cooling rate.

The size of a silver nanoparticle obtained from the silver nanopowder depends on a type of inert gas used. The size of a silver nanoparticle obtained from the silver nanopowder is 50-64 nm, when argon is used as a carrier gas. The size of a silver nanoparticle obtained from the silver nanopowder is 20-45 nm, when helium is used as a carrier gas. The silver nanoparticle has a particle size distribution of 10-100 nm.

The electromagnetic field is provided by an induction furnace inducing eddy currents in the silver sample.

According to one embodiment herein, the method for fabrication of silver nanoparticles by electromagnetic levitation method involves selecting a suitable copper tube as a levitation coil to levitate and stabilizing the molten silver droplet, heating and levitating the silver droplet simultaneously by an induction furnace, collecting the synthesized nanoparticles by brushing them off a brass cylinder using an inert gas and keeping the obtained nanoparticles in a pure hexane. the size of the nanoparticles is controlled by regulating the rate of cooling and the heating temperature.

The inert media is a media wherein the Ag nanoparticles could not be oxidized and also could not react with media. The media should be inert with respect to silver.

Properties of the produced silver nano particles were characterized by x-ray diffraction (XRD), Energy-dispersive x-ray analysis (EDX) and transmission electron microscopy (TEM). & dynamic light scattering (DLS).

The BET specific surface area of silver nanoparticles is 40 $m^2/g$ and Energy-dispersive x-ray analysis (EDX) (FIG. 7) is made to check the purity of the obtained nanoparticles. The bacterial growth is found to be dependent on the initial number of cells present rather than the shapes. The isotropy of spherical nano particles plays an important role in surface reactions like catalytic reaction.

According to one embodiment herein, spherical shaped silver nanoparticles are obtained.

According to one embodiment herein, the size of the nanoparticles depends on the kind of inert gas. As the thermal conductivity of gases increase, the size of prepared powders decreases. The size of 50-64 nm mentioned was obtained by using argon gas. By using helium gas, the silver nanoparticles with the size of 20-45 nm were obtained.

In the embodiments herein, no reducing agents and stabilizing agents are used. Commonly used reductants are borohydride, citrate, ascorbate, and elemental hydrogen. In some cases hydrogen is used as a stabilizing agent as well.

According to one embodiment herein, the present invention does not need any reductants such as borohydride, citrate and ascorbate that are toxic.

According to one embodiment herein, no hazardous by-product is released in the present invention, so nanoparticles are prepared environmentally.

According to one embodiment herein, the electromagnetic field induces eddy currents in the conducting silver sample. As a result there is an increase in the temperature of the sample and melting of the sample occurs. The interaction of the electromagnetic field with the induced field of the sample results in the sample being levitated provided the fields are strong enough to overcome gravity. Therein the levitation coils are wound differently from induction coils.

Experimental Data

The basis for induction heating lies in the ability to induce electric currents. Optimizing coil design gets the length of the molten zone minimized and improves the stability of levitated sample remarkably. The levitation coil is arranged in three layers. In electromagnetic levitation (FIG. 3), the levitation coil in the first layer provides a lifting power, while the levitation coil arranged in the second layer is responsible for heating and temperature of the sample. The levitation coil in the third layer third stabilizes the droplet. So these tests are done to design a suitable levitation coil.

The levitation tubes disclosed in the embodiments herein are made of silica glass are 10, 12 and 14 mm outside diameter with a wall thickness of 0.5 mm.

a) Silica Tube Diameter (STD)=14 mm

| Run | $N_A$ | $N_B$ | $N_C$ | α | Result |
|---|---|---|---|---|---|
| 1 | 4 | 4 | 2 | 30 | No levitation |
| 2 | 5 | 4 | 3 | 30 | No levitation |
| 3 | 6 | 3 | 2 | 30 | No levitation |
| 4 | 5 | 4 | 3 | 60 | No levitation |
| 5 | 6 | 3 | 2 | 60 | No levitation |
| 6 | 6 | 3 | 2 | 90 | No levitation |
| 7 | 6 | 3 | 2 | 120 | No levitation |
| 8 | 5 | 4 | 2 | 180 | No levitation |
| 9 | 6 | 5 | 3 | 180 | No levitation | b) Silica Tube Diameter (STD)=12 mm

| Run | $N_A$ | $N_B$ | $N_C$ | α | Result |
|---|---|---|---|---|---|
| 1 | 4 | 4 | 2 | 30 | No levitation |
| 2 | 5 | 4 | 3 | 30 | No levitation |
| 3 | 6 | 3 | 2 | 30 | No levitation |
| 4 | 5 | 4 | 3 | 60 | No levitation |
| 5 | 6 | 3 | 2 | 60 | No levitation |
| 6 | 6 | 3 | 2 | 90 | No levitation |
| 7 | 6 | 3 | 2 | 120 | No levitation |
| 8 | 5 | 4 | 2 | 180 | Unstable levitation, T = 1120° C. |
| 9 | 6 | 5 | 3 | 180 | Unstable levitation, T = 1125° C. |

C) Silica Tube Diameter (STD)=10 mm

| Run | $N_A$ | $N_B$ | $N_C$ | α | Result |
|---|---|---|---|---|---|
| 1 | 4 | 4 | 2 | 30 | No levitation |

-continued

| Run | $N_A$ | $N_B$ | $N_C$ | α | Result |
|---|---|---|---|---|---|
| 2 | 5 | 4 | 2 | 30 | No levitation |
| 3 | 6 | 3 | 2 | 30 | No levitation |
| 4 | 5 | 4 | 3 | 60 | No levitation |
| 5 | 6 | 3 | 2 | 60 | No levitation |
| 6 | 6 | 3 | 2 | 90 | No levitation |
| 7 | 6 | 3 | 3 | 120 | No levitation |
| 8 | 5 | 4 | 2 | 120 | Unstable levitation, T = 1150° C. |
| 9 | 5 | 4 | 2 | 180 | Stable sample, T = 1130° C. |
| 10 | 3 | 4 | 2 | 180 | No levitation |
| 11 | 6 | 5 | 3 | 180 | Vibrating sample, T = 1135° C. |

According to one embodiment herein, the levitation tubes (chamber) made of silica glass has an outer diameter of 14 mm and a wall thickness of 0.5 mm. The levitation tube is kept inside a levitation set such as a brass cylinder. Both the sides of the levitation set are kept open so that one side is kept open for an introduction of a carrier gas while the another side (brass cylinder) is kept open to collect the synthesized silver nanoparticles. The Levitation set is sealed by the ordinary O-rings for not losing the gas. There is no requirement for using a specific material to seal the levitation set.

According to one embodiment herein, the electromagnetic field helps to overcome the gravity and hence the levitation is done by the electromagnetic field not by the pressure of a cooling gas. The cooling gas is introduced after levitating the droplet. The induction furnace provides an electromagnetic field for inducing eddy currents in the silver sample.

According to one embodiment herein, the set up of the electromagnetic levitation is contains a compressed gas cylinder of brass. Any other element can be used instead of brass cylinder. There is no significance of using a brass cylinder.

According to one embodiment herein, the rate of cooling was 10 lit/min. heating is done at constant temperature 1130° C. In a steady-state cluster formation and distribution, the nucleation rate (J) depends on the super saturation of metal vapor in the gas phase (S).

$$J \propto \exp\left(\frac{\sigma^3}{\ln^2 S}\right)$$

Where σ is the surface tension, On the other hand, the free energy barrier against nucleation is also a function of σ and S as bellow:

$$\Delta G^* = \frac{16\pi\sigma^3}{3(\rho RT \ln S)^2}$$

Where ρ is the particle density, R is the gas constant, and T is the temperature. As the amount of under cooling determines the super saturation and also the nucleation process, it is clear that silver powder synthesis under Helium atmosphere needs less barrier energy for nucleation in comparison with Argon gas, because of its grater thermal conductivity.

According to one embodiment herein, the size of the silver nanoparticles is controlled by a super saturation process.

The super saturation process is achieved either by increasing the flow rate of the carrier gas in constant temperature or by increasing the temperature of a molten droplet by the induction furnace in a constant cooling rate.

According to one embodiment herein, the present invention is performed by a batch process. A Pyrex rod with a trapped wall is used to carry the silver shot and load the electromagnetic levitation set. However, experimentation is under process to design a continuous process. There would not be any change in results using the continuous process and there is not any significant difference between the batch and continues processes. The only difference is in the way of feeding the sample.

The embodiments herein are related to a method of producing high purity silver nanoparticles by an electromagnetic levitation melting process.

FIG. 1 illustrates a flow chart explaining the method of producing high purity silver nanoparticles by electromagnetic levitation melting method, according to one embodiment herein. With respect to FIG. 1, the method of producing a silver nanopowder by a physical vapor deposition method, involves selecting a suitable levitation coil (101). Then a levitation chamber is designed (102). The levitation chamber is sealed with the O-rings (103). A silver sample is placed in the electromagnetic field of the levitation coil at an atmospheric pressure for levitating and melting after the application of an electrical power of 15 KW and an electric current of 250 mA (104) to the levitation coil. The silver sample is heated and melted at a temperature of 1000° C. (105). The silver sample is further heated at a preset temperature of 1130° C. to produce a vaporized precursor material such as silver vapour (106). The silver vapor is cooled and condensing into silver nanopowder to obtain a silver nanoparticle by blowing a carrier gas such as an inert gas at the rate of 10 lit/min at a room temperature (107). The impurities in the carrier gas is removed by passing the carrier gas such as inert gas like argon, helium through a silica gel (108) before passing the carrier gas to cool and condense the silver vapour. The condensed silver nanoparticle is collected by brushing off a brass cylinder by blowing the inert gas and keeping the collected particles in an inert media (109). For example, the inert media is a pure n-hexane. A dilute suspension of the silver nanoparticle in high purity n-hexane with a volume ratio of 1:10000 (1 cm³ silver is dissolved in 10000 cm³ of n-hexane) is prepared in a tight container (110).

Figure 2:
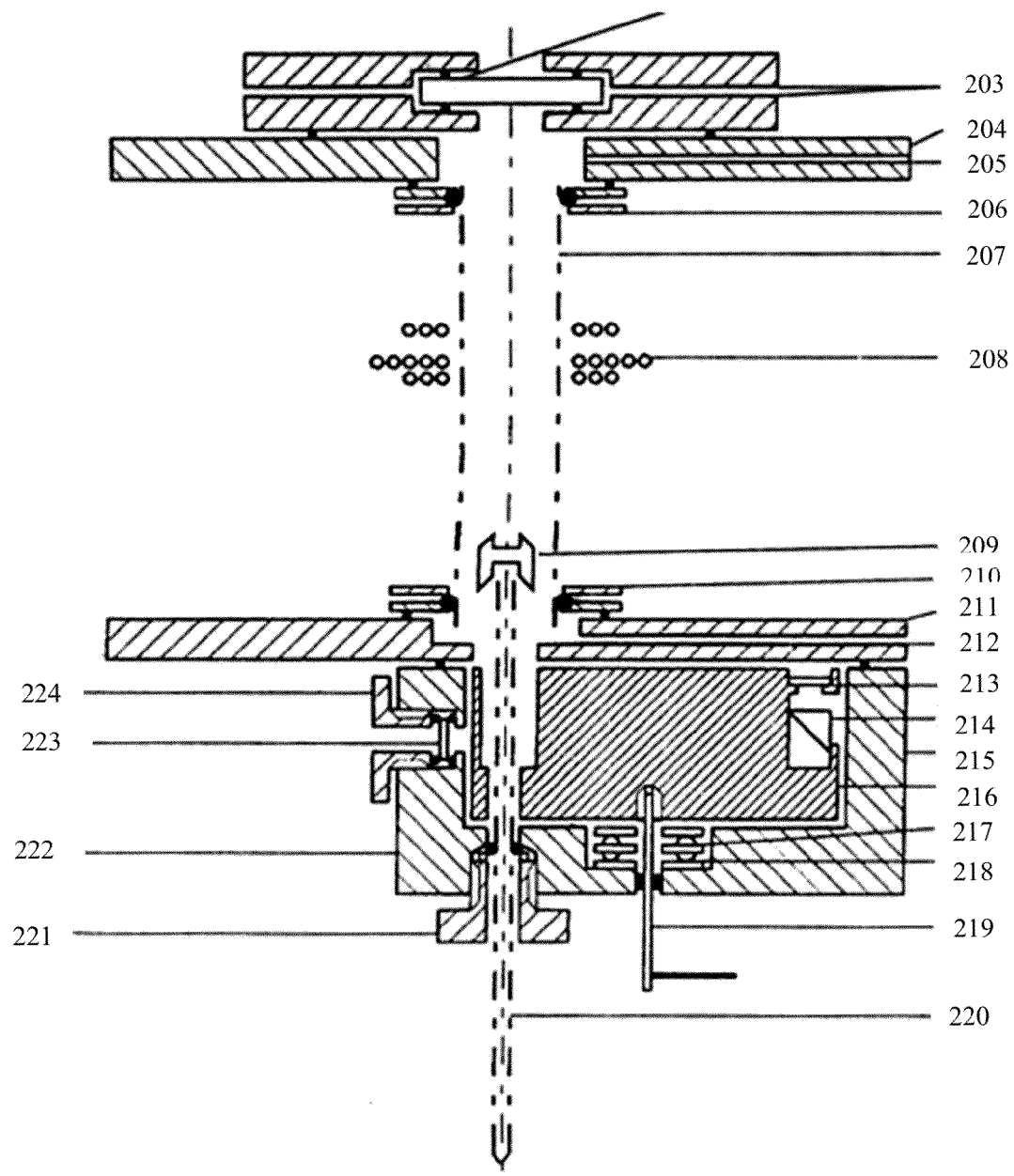
FIG. 2 illustrates an outline of the levitation chamber used in the method of producing high purity silver nanoparticles by electromagnetic levitation melting method, according to an embodiment herein.

FIG. 2 illustrates an outline of the levitation facility/levitation chamber used in the method of producing high purity silver nanoparticles by electromagnetic levitation melting method, according to an embodiment herein. With respect to FIG. 2, The levitation chamber is made of silica glass tube 207 with an outside diameter of 14 mm and with a wall thickness of 0.5 mm. The facility further comprises a mirror, a top optical window sealing plates for not losing the gas, a top optical window 203, a top flange 205 and a top sealing arrangement 206. The length of the molten zone is minimized by optimizing a coil design gets to improve the stability of levitated sample remarkably. A suitable copper tube is used as a levitation coil 208 to levitate. The silver sample to levitate is supported by a sample holder 209 in the electromagnetic field of the levitation coil 208 to levitate and melt silver. Electromagnetic field induces eddy currents in the conducting sample. As a result temperature of the sample increases and it might melt. The interaction of the electromagnetic field with the induced field of the sample results in the sample being levitated provided the fields are strong enough to overcome gravity. That is why the levitation coils 208 are wound differently from induction coils. The basis for induction heating lies in the ability to induce electric currents. Both the sides of the levitation chamber have openings. An opening provided on one side of the chamber acts as a gas inlet 212 to enable the carrier gas to be blown inside the chamber from the silica gel for cooling the silver droplet and an opening on on another side acts as a gas outlet 204. The vaporized precursor material and the synthesized nanoparticles obtained by heating the silver sample are collected in an inert media. The chamber is further designed having a bottom sealing arrangement 210, a bottom flange 211, a prism optical window 213, a prism 214, a turn table case 215, a turn table 216, a ball bearing 217, a ball wearing washers 218, a turn table handle 219, an alumina push rod 220, an alumina push rod sealing gland 221, an alumina push rod washer 222, a bottom optical window 223 and a bottom optical window sealing gland 224.

Figure 3:
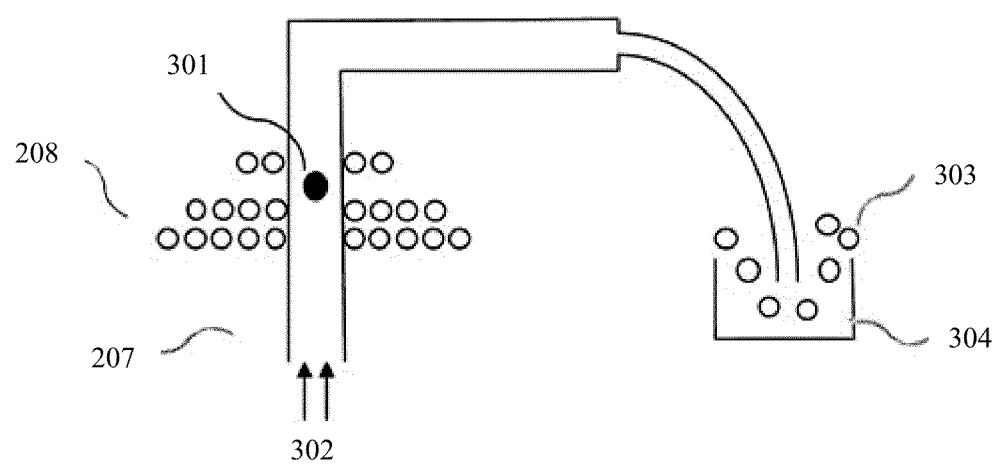
FIG. 3 illustrates an outline of the levitation set used in the method of producing high purity silver nanoparticles by electromagnetic levitation melting method, according to an embodiment herein.

FIG. 3 illustrates an outline of the levitation chamber used in the method of producing high purity silver nanoparticles by electromagnetic levitation melting method, according to an embodiment herein. With respect to FIG. 3, the levitation chamber has levitation tubes 301 made of silica glass with an outer diameter of 14 mm and a wall thickness of 0.5 mm. The levitation tube 301 is kept inside a levitation set such as a brass cylinder. Both the sides of the levitation set are kept open so that one side is kept open for an introduction of a carrier gas 302 while another side (brass cylinder) is kept open to collect the synthesized silver nanoparticles. The Levitation set is sealed by the ordinary O-rings for not losing the gas. There is no requirement for using a specific material to seal the levitation set. The levitation coil 208 is wound around the levitation tube 301. The levitation coil 208 is arranged in three layers to provide a lifting power for the silver sample, to heating and melt the silver sample and to stabilize the droplet.

A silver sample is placed in the electromagnetic field of the levitation coil 208 at an atmospheric pressure to levitate and melt the silver sample simultaneously. The levitated and melted silver sample is heated at a constant temperature to produce a vaporized precursor material and wherein the vaporized precursor material is a silver vapour. A carrier gas is blown at a preset rate at a room temperature to cool and condense the silver vapour into a silver nanopowder to obtain a silver nanoparticle. The silver nanoparticle is collected in an inert media to obtain a dilute suspension of the silver nanoparticles in the inert media in an air tight container by blowing an inert gas at a room temperature and wherein the inert media is a pure n-hexane. The obtained nanoparticles are kept in n-hexane 304 forming a dilute suspension. As the n-hexane vaporizes in form of gas bubbles 303 rapidly the suspension is finally prepared. The electromagnetic field helps to overcome the gravity and hence the levitation is done by the electromagnetic field not by the pressure of a cooling gas. The cooling gas is introduced after levitating the droplet.

Figure 4:
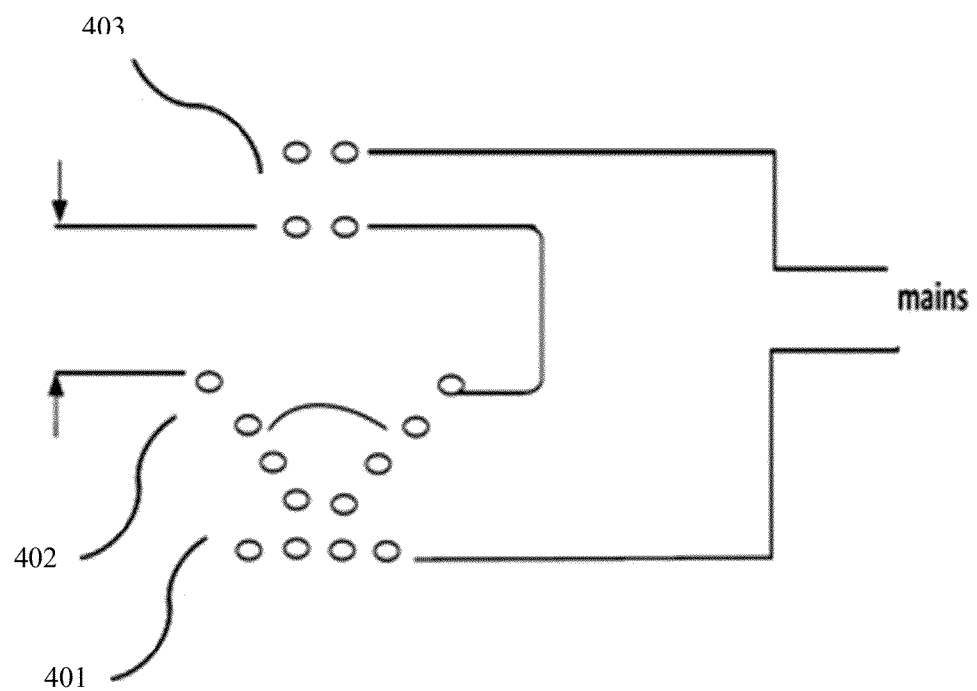
FIG. 4 illustrates a schematic of levitation coil used for the electromagnetic melting process in the method of producing high purity silver nanoparticles by electromagnetic levitation melting method, according to an embodiment herein.

FIG. 4 illustrates a schematic of levitation coil used for the electromagnetic melting process in the method of producing high purity silver nanoparticles by electromagnetic levitation melting method, according to an embodiment herein. With respect to FIG. 4, the levitation coil is arranged in three layers. The first layer of the levitation coil 401 provides a lifting power for the silver sample while the second layer of the levitation coil 402 is responsible for heating and melting the silver sample. The third layer of the levitation coil 403 stabilizes the droplet The coil has NA=5, NB=4, NC=2, d=10 mm and α=180° for the levitation coil used for synthesizing silver nano particles in the present invention, wherein NA is the number of turns in levitation coils arranged in the first layer 401, NB is the number of turns in levitation coils arranged in the second layer 402, NC is the number of turns in levitation coils arranged in the third layer 403.

Figure 5:
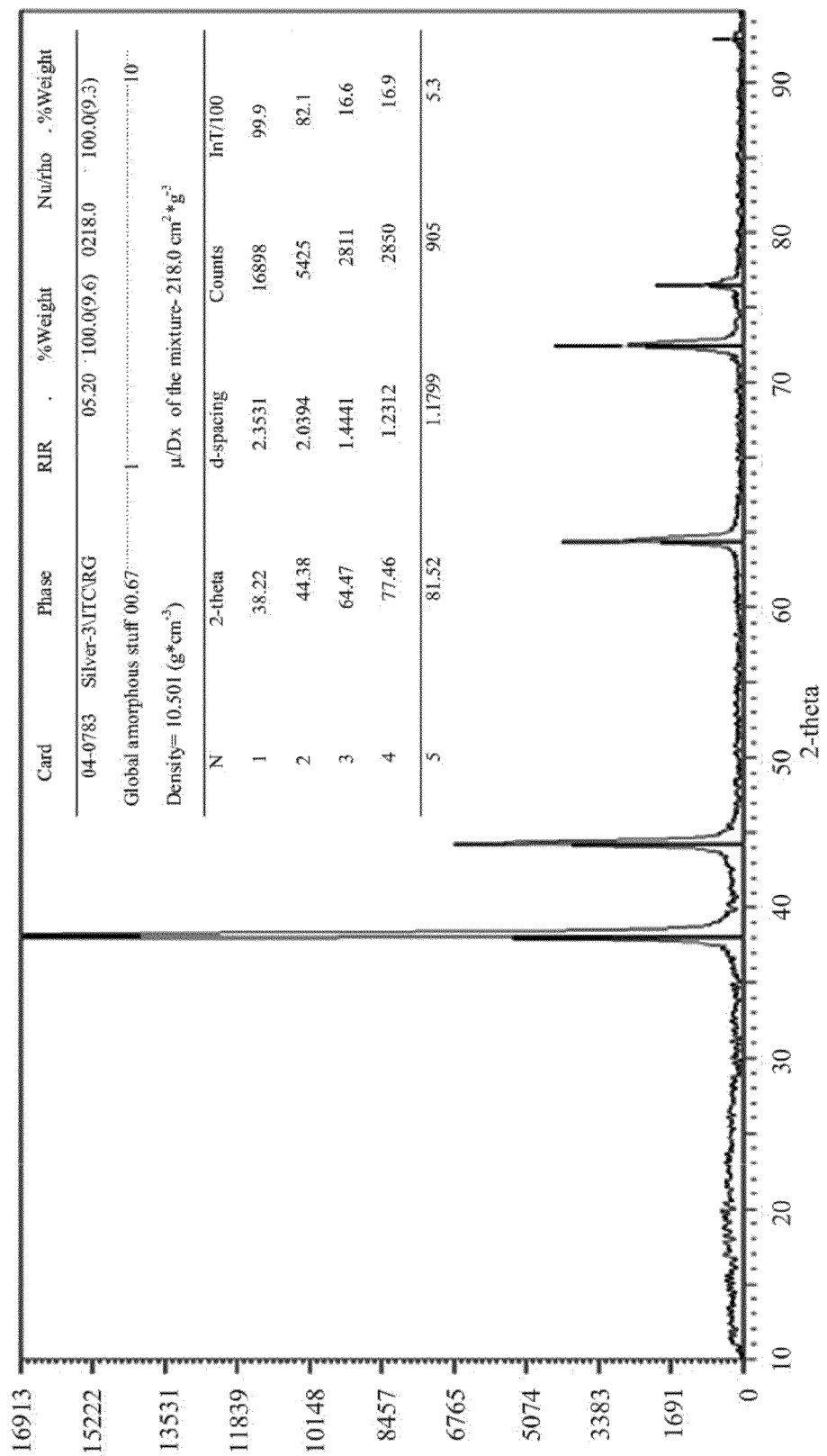
FIG. 5 illustrates the x-ray diffraction (XRD) pattern of silver nanopowder under Argon atmosphere.

FIG. 5 illustrates the x-ray diffraction pattern (XRD) of the produced silver nanoparticles under argon atmosphere. The sample showed the major characteristic peaks for pure crystalline silver at 2θ values of 38.22, 44.38, 64.47, 77.46 and 81.52°.

Figure 6:
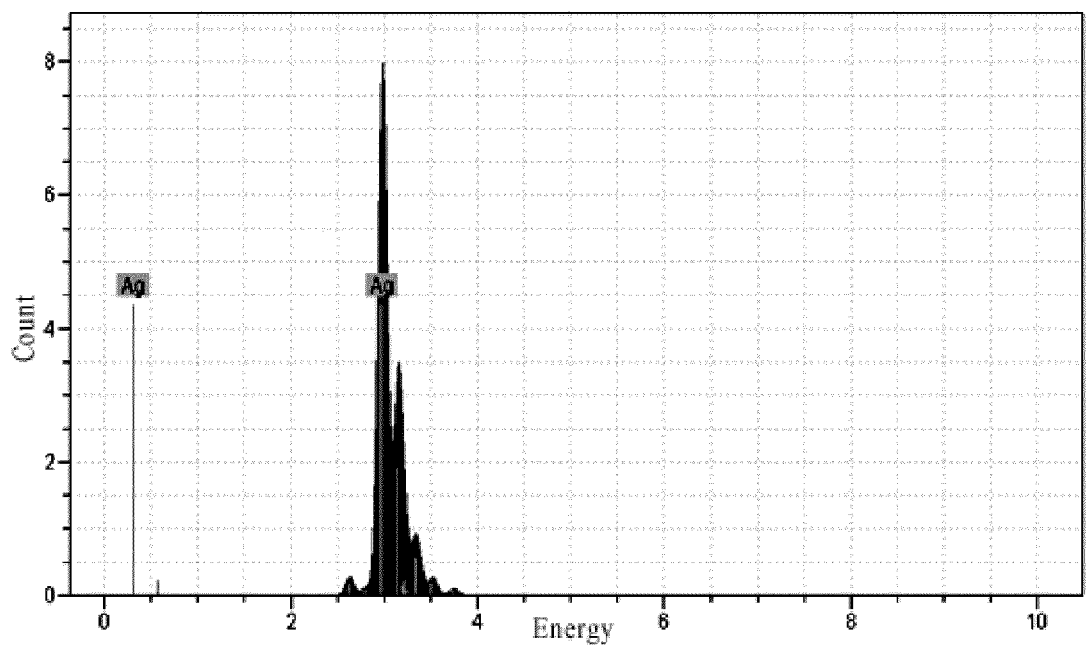
FIG. 6 illustrates an Energy-dispersive x-ray analysis (EDX) of silver nanoparticles under Argon atmosphere.

FIG. 6 illustrates the Energy-dispersive x-ray analysis (EDX) spectrum of the synthesized nanoparticles. The EDX spectrum illustrated the presence of Ag with the purity of 100% as the only element. This indicates that there is no significant amount of crystalline silver oxide or other crystalline material formed.

Figure 7:
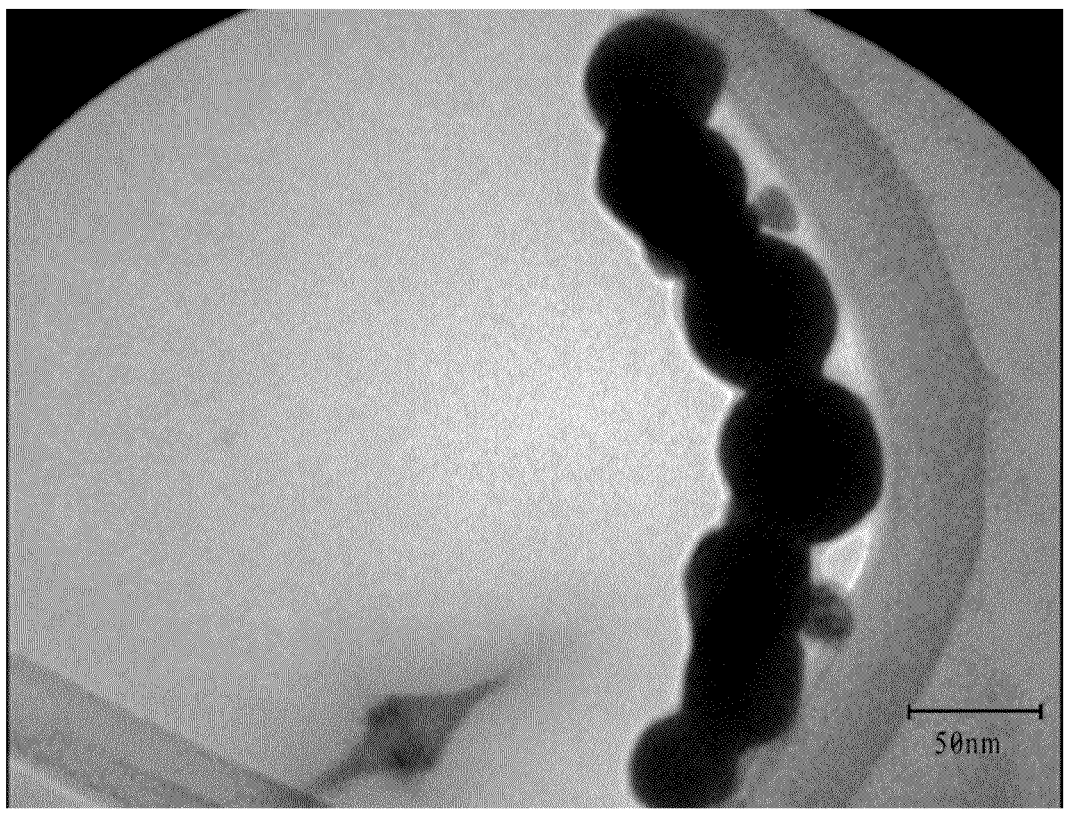
FIG. 7 illustrates the transmission electron microscopy (TEM) of silver nanoparticles synthesized under argon atmosphere.

FIG. 7 illustrates a transmission electron microscopy (TEM) of high purity silver nanoparticles synthesized by the electromagnetic levitation melting process under argon atmosphere. The fine spherical silver nanoparticle of about 50-64 nm are obtained.

Figure 8:
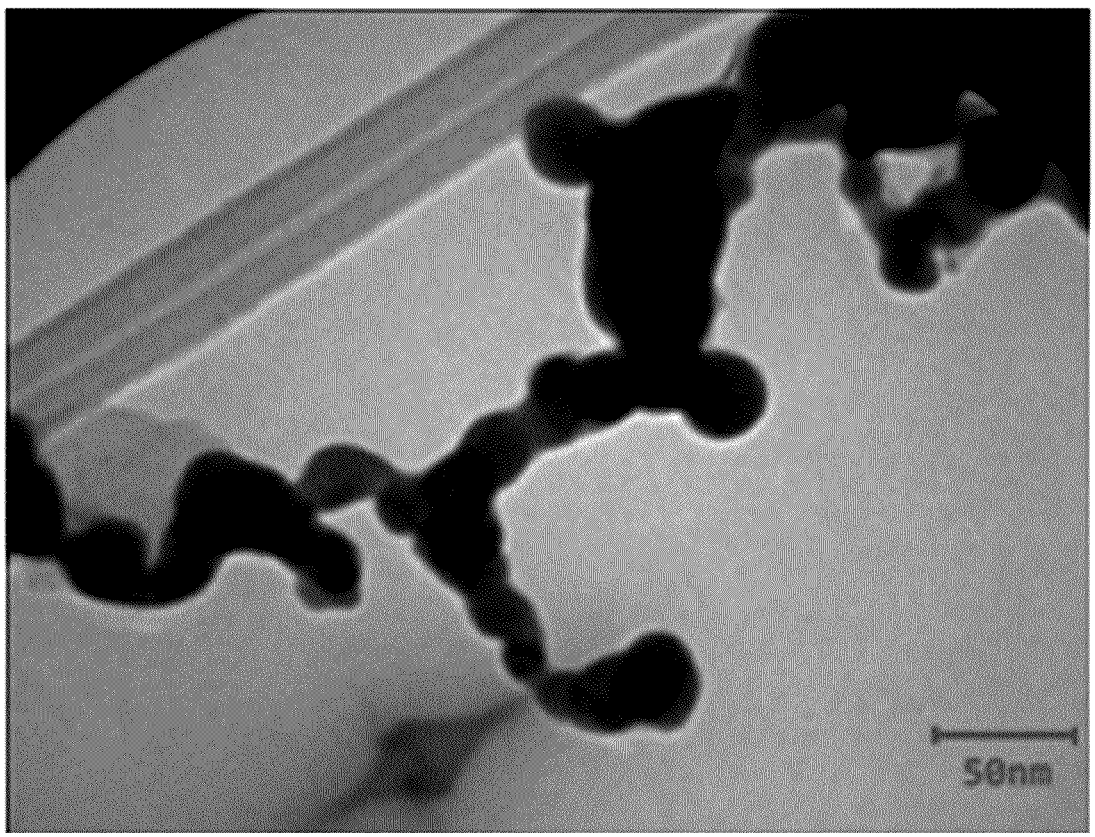
FIG. 8 illustrates the transmission electron microscopy (TEM) of silver nanoparticles synthesized under helium atmosphere.

FIG. 8 illustrates the transmission electron microscopy (TEM) of silver nanoparticles synthesized under helium atmosphere. The fine spherical silver nanoparticle of about 20-45 nm are obtained.

Figure 9:
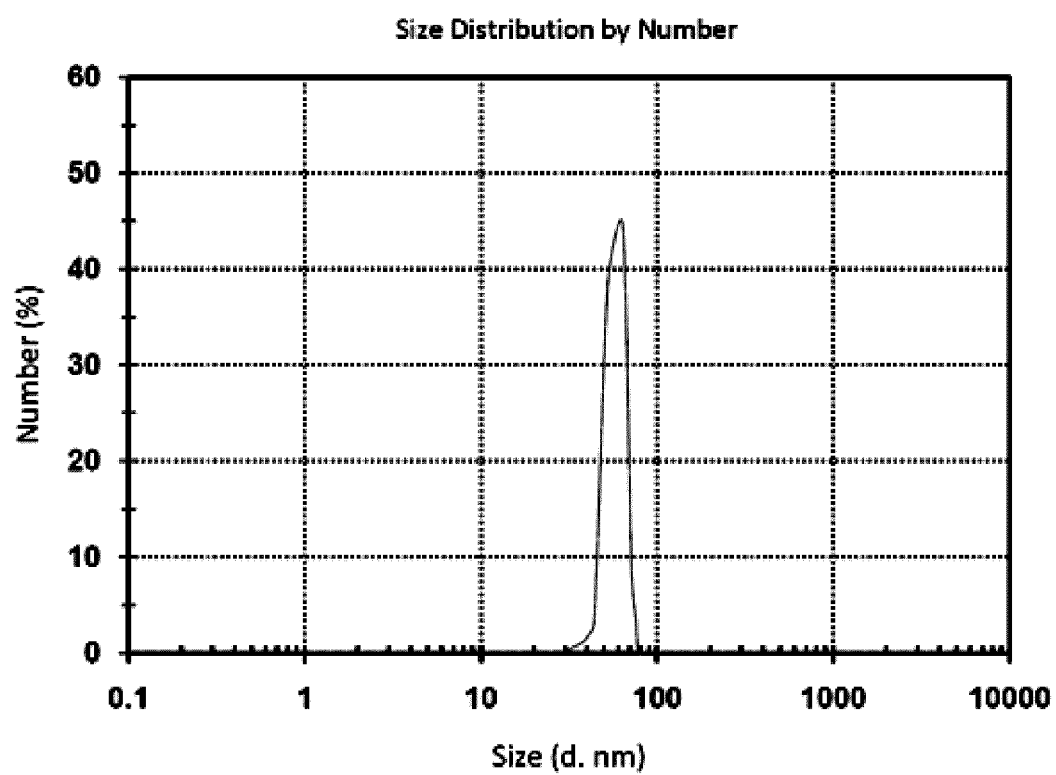
FIG. 9 illustrates the dynamic light scattering (DLS) results.

FIG. 9 illustrates the dynamic light scattering (DLS) results. The DLS results also confirm the narrow size distribution of synthesized nanoparticles with particle size of about 64 nm under argon atmosphere.

It is noted that the disclosed arrangements are only illustrative of the application of the principles of the embodiments herein. Many modifications may be contrived in the structures illustrated herein without departing from the spirit and scope of the embodiments herein. The disclosed embodiments herein are to be considered in all respects only as illustrative and not restrictive. The scope of the embodiments herein is also indicated by the appended claim.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. A method of producing a silver nanopowder using electromagnetic levitation process, the method comprises:
designing a levitation chamber;
selecting a suitable levitation coil; placing the levitation coil around the levitation chamber;

placing a silver sample in an electromagnetic field of the levitation coil at an atmospheric pressure to levitate and melt the silver sample simultaneously;

heating the levitated and melted silver sample at a constant temperature to produce a vaporized precursor material and wherein the vaporized precursor material is a silver vapor;

blowing a carrier gas at a preset rate at a room temperature to cool and condense the silver vapor into a silver nanopowder to obtain a silver nanoparticle;

collecting the silver nanoparticle in an inert media to obtain a dilute suspension of the silver nano particles in the inert media in an airtight container by blowing said carrier gas at a room temperature and wherein the inert media is a pure n-hexane.

2. The method according to claim 1, wherein the levitation chamber is made of a silica glass tube with an outer diameter of 10-14 mm and a wall thickness of 0.5 mm.

3. The method according to claim 1, wherein the levitation chamber is sealed by an 0-ring.

4. The method according to claim 1, wherein the levitation coil is a copper tube.

5. The method according claim 1, wherein the levitation coil is arranged in a first layer, a second layer and a third layer with mutually different number of turns and wherein the levitation coil arranged in the first layer has a number of turns of 5 for providing a lifting power to the silver sample and wherein the levitation coil arranged in the second layer has a number of turns of 4 for heating the silver sample and for maintaining a temperature and wherein the levitation coil arranged in the third layer has a number of turns of 2 for stabilizing a silver droplet.

6. The method according to claim 1, wherein the levitation coil has a diameter of 10 mm.

7. The method according to claim 1, wherein the levitation is achieved by passing an electrical power of 15 KW at an electric current of 250 mA through the levitation coil to generate an electromagnetic field to levitate and melt the silver sample simultaneously at a temperature of 1000.degree. C.

8. The method according to claim 1, wherein the silver sample is heated at the constant temperature using an induction furnace to produce the vaporized precursor material and wherein the constant temperature is 1130.degree. C.

9. The method according to claim 1, wherein the carrier gas is an inert gas.

10. The method according to claim 9, wherein the inert gas is argon.

11. The method according to claim 9, wherein the inert gas is helium.

12. The method according to claim 9, wherein the inert gas is passed through a silica gel to remove impurities present in the inert gas before passing the inert gas through the levitation chamber to collect the silver nanoparticles.

13. The method according claim 9, wherein the size of a silver nanoparticle obtained from the silver nanopowder depends on a type of the inert gas used and wherein the size of a silver nanoparticle obtained from the silver nanopowder is 50-64 nm, when argon is used as a carrier gas and wherein the size of a silver nanoparticle obtained from the silver nanopowder is 20-45 nm, when helium is used as a carrier gas.

14. The method according to claim 1, wherein the dilute suspension of the silver particle in a high purity n-hexane has a volume ratio of 1:10000.

15. The method according claim 1, wherein a length of a molten zone is minimized by optimizing a design of the levitation coil to improve stability of the levitated silver sample.

16. The method according to claim 1, wherein a size of the silver nanoparticles is controlled by a super saturation process.

17. The method according to claim 16, wherein the super saturation process is achieved by increasing a flow rate of the carrier gas at a constant temperature of 1130.degree. C.

18. The method according to claim 16, wherein the super saturation process is achieved by increasing a temperature of a molten droplet using an induction furnace at a constant cooling rate.

19. The method according claim 1, wherein the silver nanoparticle has a particle size distribution of 10-100 nm.

20. The method according claim 1, wherein the electromagnetic field is provided by an induction furnace for inducing eddy currents in the silver sample.

* * * * *